(12) United States Patent
Wang et al.

(10) Patent No.: US 10,706,267 B2
(45) Date of Patent: Jul. 7, 2020

(54) COMPACT MODELS FOR OBJECT RECOGNITION

(71) Applicant: QUALCOMM Incorporated, San Diego, CA (US)

(72) Inventors: Lei Wang, Clovis, CA (US); Ning Bi, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 15/869,342

(22) Filed: Jan. 12, 2018

(65) Prior Publication Data

US 2019/0220653 A1    Jul. 18, 2019

(51) Int. Cl.
  *G06K 9/00* (2006.01)
  *G06K 9/66* (2006.01)
  *G06K 9/62* (2006.01)

(52) U.S. Cl.
  CPC ..... *G06K 9/00288* (2013.01); *G06K 9/00268* (2013.01); *G06K 9/6274* (2013.01); *G06K 9/66* (2013.01)

(58) Field of Classification Search
  CPC .............................. G06K 9/00288; G06K 9/66
  See application file for complete search history.

(56) References Cited

U.S. PATENT DOCUMENTS

| | | | | |
|---|---|---|---|---|
| 9,953,437 | B1* | 4/2018 | Kim | ...... G06K 9/4628 |
| 10,474,925 | B2* | 11/2019 | Huang | ...... G06N 3/0454 |
| 2011/0119567 | A1* | 5/2011 | Tu | ...... H03M 13/235 |
| | | | | 714/786 |
| 2015/0178246 | A1* | 6/2015 | Herrero Abellanas | ...... |
| | | | | G06F 17/153 |
| | | | | 708/300 |
| 2015/0350576 | A1* | 12/2015 | Zimmer | ...... G06T 5/002 |
| | | | | 345/591 |
| 2016/0148079 | A1* | 5/2016 | Shen | ...... G06K 9/4628 |
| | | | | 382/157 |
| 2016/0148080 | A1* | 5/2016 | Yoo | ...... G06K 9/4628 |
| | | | | 382/157 |
| 2016/0379073 | A1* | 12/2016 | Pan | ...... G06K 9/00986 |
| | | | | 382/279 |

(Continued)

OTHER PUBLICATIONS

Wu et al., "A Light CNN for Deep Face Representation with Noisy Labels." arXiv preprint arXiv:1511.02683 (2015). (Year: 2015).*

(Continued)

*Primary Examiner* — Feng Niu
(74) *Attorney, Agent, or Firm* — Holland & Hart LLP

(57) ABSTRACT

Methods, systems, and devices for object recognition are described. Generally, the described techniques provide for a compact and efficient convolutional neural network (CNN) model for facial recognition. The proposed techniques relate to a light model with a set of layers of convolution and one fully connected layer for feature representation. A new building block of for each convolution layer is proposed. A maximum feature map (MFM) operation may be employed to reduce channels (e.g., by combining two or more channels via maximum feature selection within the channels). Depth-wise separable convolution may be employed for computation reduction (e.g., reduction of convolution computation). Batch normalization may be applied to normalize the output of the convolution layers and the fully connected layer (e.g., to prevent overfitting). The described techniques provide a compact and efficient CNN model which can be used for efficient and effective face recognition.

17 Claims, 7 Drawing Sheets

(56) References Cited

U.S. PATENT DOCUMENTS

| | | | | |
|---|---|---|---|---|
| 2017/0249445 | A1* | 8/2017 | Devries | G16H 10/60 |
| 2017/0351936 | A1* | 12/2017 | Jiang | G06K 9/60 |
| 2017/0357889 | A1* | 12/2017 | Zhang | G06N 3/02 |
| 2018/0068198 | A1* | 3/2018 | Savvides | G06K 9/3233 |
| 2018/0137647 | A1* | 5/2018 | Li | G06K 9/4671 |
| 2018/0211157 | A1* | 7/2018 | Liu | G06K 9/6232 |
| 2019/0014320 | A1* | 1/2019 | Navarrete Michelini | H04N 19/63 |
| 2019/0034761 | A1* | 1/2019 | Huang | G06K 9/4628 |
| 2019/0087686 | A1* | 3/2019 | Du | G06K 9/629 |
| 2019/0095706 | A1* | 3/2019 | Fujimoto | G06K 9/00335 |

OTHER PUBLICATIONS

Krizhevsky et al., "Imagenet classification with deep convolutional neural networks." In Advances in neural information processing systems, pp. 1097-1105. 2012. (Year: 2012).*
Luo et al., "An entropy-based pruning method for cnn compression." arXiv preprint arXiv:1706.05791 (2017). (Year: 2017).*
Ahmed et al., "Connectivity learning in multi-branch networks." arXiv preprint arXiv:1709.09582 (2017). (Year: 2017).*
Yang et al., "Learning feature pyramids for human pose estimation." In proceedings of the IEEE international conference on computer vision, pp. 1281-1290. 2017. (Year: 2017).*
Wu X., et al., "A Light CNN for Deep Face Representation with Noisy Labels," Apr. 24, 2017, 13 pages, arXiv:1511.02683v3 [cs.CV], Center for Research on Intelligent Perception and Computing (CRIPAC), National Laboratory of Pattern Recognition (NLPR), Institute of Automation, Chinese Academy of Sciences, Beijing, P.R. China, 100190.

* cited by examiner

COMPACT MODELS FOR OBJECT RECOGNITION

BACKGROUND

The following relates generally to object recognition, and more specifically to compact models for object recognition.

Object recognition may refer to a field of computer vision for finding and identifying objects in an image or video sequence. As an example of object recognition, facial recognition may refer to a process used to identify or verify a person (e.g., from a digital image, a frame of a video clip, etc.) based on one or more facial features. Generally, facial features may be extracted from the image and compared with features stored in a database. Additionally or alternatively, the extracted facial features may be fed to a classifier, which may in turn generate an identity hypothesis based on the input features. Facial recognition may involve one or more steps including face detection, face tracking, facial landmark detection, face normalization, feature extraction, identification/verification, or a combination thereof. In some cases, facial recognition may be based at least in part on processing the digital image or video frame using a convolutional neural network (CNN).

Generally, a CNN may refer to a class of feed-forward artificial neural networks in which the connectivity pattern between nodes of the neural network resembles that of neurons in various biological processes. CNNs for facial recognition may be computationally complex, utilizing large amounts of memory, processing, power, time, etc. There currently exist a variety of portable computing devices, such as portable wireless telephones, personal digital assistants (PDAs), laptop computers, tablet personal computers, eBook viewers, and the like. More specifically, some of these devices may include digital imaging sensors for taking photos (and video) as well as components for communicating voice and data packets over wired or wireless networks (e.g., for downloading videos and images). Such devices may benefit from improved facial recognition techniques (e.g., to reduce memory requirements, processing load, power consumption, time, etc.).

SUMMARY

The described techniques relate to improved methods, systems, devices, or apparatuses that support compact models for object recognition. Generally, aspects of the described techniques provide for a compact and efficient CNN model for facial recognition on an embedded device (e.g., a wireless device). The proposed techniques relate to a light model with a set (e.g., five) of layers of convolution and one fully connected layer for feature representation. A new building block for the convolution layers is proposed. A maximum feature map (MFM) operation may be employed to reduce channels (e.g., by combining two or more channels via maximum feature selection within the channels). Depth-wise separable convolution may be employed for computation reduction (e.g., reduction of convolution computation). Batch normalization may be applied to normalize the output of the convolution layers and the fully connected layer (e.g., to prevent overfitting by reducing covariate shift). The described techniques provide a compact and efficient CNN model which can be used for efficient and effective face recognition.

Additionally or alternatively, the described techniques may relate to detection of closed eyes in a recognized face (e.g., which may be referred to herein as "ocular detection").

Ocular detection may represent an important task for facial authentication systems. For example, such systems may be operable to reject (i.e., not recognize) faces with closed eyes, which may provide additional security (e.g., by preventing unauthorized access to a device while a registered user is sleeping). Aspects of the CNN model for facial recognition described below may be extended to detect whether eyes are closed (e.g., with little computational overhead). Such techniques may make ocular detection (e.g., which may otherwise require large amounts of memory and processing) relatively trivial because much of the computation is performed for facial feature extraction, while only an additional subnet of (e.g., two) fully connected layers is added for ocular detection. Though described in the context of ocular detection, the framework described below may additionally or alternatively be extended to recognize other facial attributes (e.g., with little computational overhead).

A method of object recognition is described. The method may include obtaining a two-dimensional array of pixels representing an image, applying a first convolutional operation to the two-dimensional array of pixels to generate a plurality of input channels, performing a set of processing operations on the plurality of input channels to generate a plurality of output channels, and recognizing an object in the image based at least in part on the plurality of output channels. For example, the set of processing operations may include applying a second convolutional operation to the plurality of input channels to generate a second plurality of input channels, dividing the second plurality of input channels into channel groups, wherein each input channel of the second plurality of input channels is associated with a single channel group, performing a feature selection operation for each channel group to generate a plurality of intermediate channels, wherein each intermediate channel is associated with a respective channel group, and applying a third convolutional operation to the plurality of intermediate channels, wherein the third convolutional operation comprises a first operation applied to each intermediate channel to generate a plurality of feature maps followed by a second operation applied across the plurality of feature maps to generate the plurality of output channels.

An apparatus for object recognition is described. The apparatus may include means for obtaining a two-dimensional array of pixels representing an image, means for applying a first convolutional operation to the two-dimensional array of pixels to generate a plurality of input channels, means for performing a set of processing operations on the plurality of input channels to generate a plurality of output channels, and means for recognizing an object in the image based at least in part on the plurality of output channels. For example, the means for performing the set of processing operations may include means for applying a second convolutional operation to the plurality of input channels to generate a second plurality of input channels, means for dividing the second plurality of input channels into channel groups, wherein each input channel of the second plurality of input channels is associated with a single channel group, means for performing a feature selection operation for each channel group to generate a plurality of intermediate channels, wherein each intermediate channel is associated with a respective channel group, and means for applying a third convolutional operation to the plurality of intermediate channels, wherein the third convolutional operation comprises a first operation applied to each intermediate channel to generate a plurality of feature maps followed by a second operation applied across the plurality of feature maps to generate a plurality of output channels.

Another apparatus for object recognition is described. The apparatus may include a processor, memory in electronic communication with the processor, and instructions stored in the memory. The instructions may be operable to cause the processor to obtain a two-dimensional array of pixels representing an image, apply a first convolutional operation to the two-dimensional array of pixels to generate a plurality of input channels, perform a set of processing operations on the plurality of input channels to generate a plurality of output channels, and recognize an object in the image based at least in part on the plurality of output channels. For example, the set of processing operations may include instructions operable to cause the processor to apply a second convolutional operation to the plurality of input channels to generate a second plurality of input channels, divide the second plurality of input channels into channel groups, wherein each input channel of the second plurality of input channels is associated with a single channel group, perform a feature selection operation for each channel group to generate a plurality of intermediate channels, wherein each intermediate channel is associated with a respective channel group, and apply a third convolutional operation to the plurality of intermediate channels, wherein the third convolutional operation comprises a first operation applied to each intermediate channel to generate a plurality of feature maps followed by a second operation applied across the plurality of feature maps to generate a plurality of output channels.

A non-transitory computer-readable medium for object recognition is described. The non-transitory computer-readable medium may include instructions operable to cause a processor to obtain a two-dimensional array of pixels representing an image, apply a first convolutional operation to the two-dimensional array of pixels to generate a plurality of input channels, perform a set of processing operations on the plurality of input channels to generate a plurality of output channels, and recognize an object in the image based at least in part on the plurality of output channels. For example, the set of processing operations may include instructions operable to cause the processor to apply a second convolutional operation to the plurality of input channels to generate a second plurality of input channels, divide the second plurality of input channels into channel groups, wherein each input channel of the second plurality of input channels is associated with a single channel group, perform a feature selection operation for each channel group to generate a plurality of intermediate channels, wherein each intermediate channel is associated with a respective channel group, and apply a third convolutional operation to the plurality of intermediate channels, wherein the third convolutional operation comprises a first operation applied to each intermediate channel to generate a plurality of feature maps followed by a second operation applied across the plurality of feature maps to generate a plurality of output channels.

In some examples of the method, apparatus, and non-transitory computer-readable medium described above, performing the set of processing operations further comprises applying the second convolutional operation to the plurality of output channels to generate a third plurality of input channels. Some examples of the method, apparatus, and non-transitory computer-readable medium described above may further include processes, features, means, or instructions for dividing the third plurality of input channels into second channel groups, wherein each input channel of the third plurality of input channels may be associated with a single second channel group. Some examples of the method, apparatus, and non-transitory computer-readable medium described above may further include processes, features, means, or instructions for performing the feature selection operation for each second channel group to generate a second plurality of intermediate channels, wherein each intermediate channel of the second plurality of intermediate channels may be associated with a respective channel group of the second channel groups. Some examples of the method, apparatus, and non-transitory computer-readable medium described above may further include processes, features, means, or instructions for applying a pooling function to the second plurality of intermediate channels to generate a second plurality of output channels, wherein the object in the image may be recognized based at least in part on the second plurality of output channels.

In some examples of the method, apparatus, and non-transitory computer-readable medium described above, performing the set of processing operations further comprises applying one or more batch normalization operations, each batch normalization operation adjusting a mean of one or more channels, a variance of one or more channels, or both.

In some examples of the method, apparatus, and non-transitory computer-readable medium described above, the set of processing operations may be performed a plurality of times, and wherein the plurality of input channels of a second iteration of the set of processing operations may be based at least in part on the plurality of output channels of a first iteration of the set of processing operations.

Some examples of the method, apparatus, and non-transitory computer-readable medium described above may further include processes, features, means, or instructions for feeding the plurality of output channels of a last iteration of the set of processing operations to a fully connected layer to generate a plurality of connected-layer output channels. Some examples of the method, apparatus, and non-transitory computer-readable medium described above may further include processes, features, means, or instructions for dividing the plurality of connected-layer output channels into third channel groups, wherein each connected-layer output channel of the plurality of connected-layer output channels may be associated with a single channel group of the third channel groups. Some examples of the method, apparatus, and non-transitory computer-readable medium described above may further include processes, features, means, or instructions for performing the feature selection operation for each third channel group to generate a plurality of final channels, wherein each final channel may be associated with a respective channel group of the third channel groups and wherein the object in the image may be recognized based at least in part on the plurality of final channels.

Some examples of the method, apparatus, and non-transitory computer-readable medium described above may further include processes, features, means, or instructions for feeding the plurality of output channels of the last iteration of the set of processing operations to a second fully connected layer to generate a second plurality of connected-layer output channels. Some examples of the method, apparatus, and non-transitory computer-readable medium described above may further include processes, features, means, or instructions for dividing the second plurality of connected-layer output channels into fourth channel groups, wherein each connected-layer output channel of the second plurality of connected-layer output channels is associated with a single channel group of the fourth channel groups. Some examples of the method, apparatus, and non-transitory computer-readable medium described above may further include processes, features, means, or instructions for performing the feature selection operation for each fourth channel group to generate a second plurality of final channels, wherein each final channel of the second plurality of final channels is associated with a respective channel group of the fourth channel groups. Some examples of the method, apparatus, and non-transitory computer-readable medium described above may further include processes, features, means, or instructions for detecting a feature of the object in the image based at least in part on the second plurality of final channels.

In some examples of the method, apparatus, and non-transitory computer-readable medium described above, dividing the second plurality of input channels into channel groups comprises dividing the second plurality of input channels into pairs such that a number of the plurality of intermediate channels may be half a number of the second plurality of input channels.

In some examples of the method, apparatus, and non-transitory computer-readable medium described above, applying the first convolutional operation to the two-dimensional array of pixels comprises applying a plurality of convolution kernels to the two-dimensional array of pixels to generate a plurality of initial input channels, each convolution kernel having a same size. Some examples of the method, apparatus, and non-transitory computer-readable medium described above may further include processes, features, means, or instructions for applying a batch normalization operation to the plurality of initial input channels to generate a plurality of normalized input channels, wherein the batch normalization operation adjusts a mean of one or more initial input channels, a variance of one or more initial input channels, or both. Some examples of the method, apparatus, and non-transitory computer-readable medium described above may further include processes, features, means, or instructions for dividing the plurality of normalized input channels into initial channel groups, wherein each normalized input channel of the plurality of normalized input channels may be associated with a single channel group of the initial channel groups. Some examples of the method, apparatus, and non-transitory computer-readable medium described above may further include processes, features, means, or instructions for performing the feature selection operation for each initial channel group to generate the plurality of input channels, wherein each input channel may be associated with a respective initial channel group.

DETAILED DESCRIPTION

Object recognition refers to a field of computer vision for finding and identifying objects in an image or video sequence. Though aspects of the following are described in the context of facial recognition, it is to be understood that the described techniques may be extended to recognition of other objects in an image (e.g., animals, inanimate objects, etc.) without deviating from the scope of the present disclosure. Facial recognition refers to the process of identifying or verifying a person from a digital image or video frame. For example, facial recognition may compare selected facial features from the image to a face database. In some examples, facial recognition may be achieved based at least in part on processing an image using a CNN. For example, the CNN may process the image using a number of layers to generate feature maps, which may be analyzed and combined. Some such CNNs may utilize or require large amounts of memory and time to achieve reliable recognition. Such CNNs may be infeasible for devices which operate under power constraints or would otherwise benefit from reductions in computational complexity (e.g., mobile devices). The proposed techniques relate to a light model with a set (e.g., five) of layers of convolution and one fully connected layer for feature representation.

CNN models operating in accordance with the ordered combination of steps described below may provide efficient, reliable object recognition. For example, CNN models in which a MFM operation is cascaded with a depth-wise separable convolution layer may realize processing savings (e.g., in terms of memory usage, processing time, power consumption, etc.) without corresponding reductions in performance. Generally, the MFM operation may provide for channel reduction while the depth-wise separable convolution may provide for convolution reduction (e.g., for each channel). For example, by strategically selecting channels to combine in the MFM operation (e.g., based at least in part on the operations to be performed during the depth-wise separable convolution), a device may reduce a processing load without compromising reliability.

Aspects of the disclosure are initially described in the context of a digital image and process flows related to compact models for object recognition. Aspects of the disclosure are further illustrated by and described with reference to apparatus diagrams, system diagrams, and flowcharts that relate to compact models for object recognition.

Figure 1:
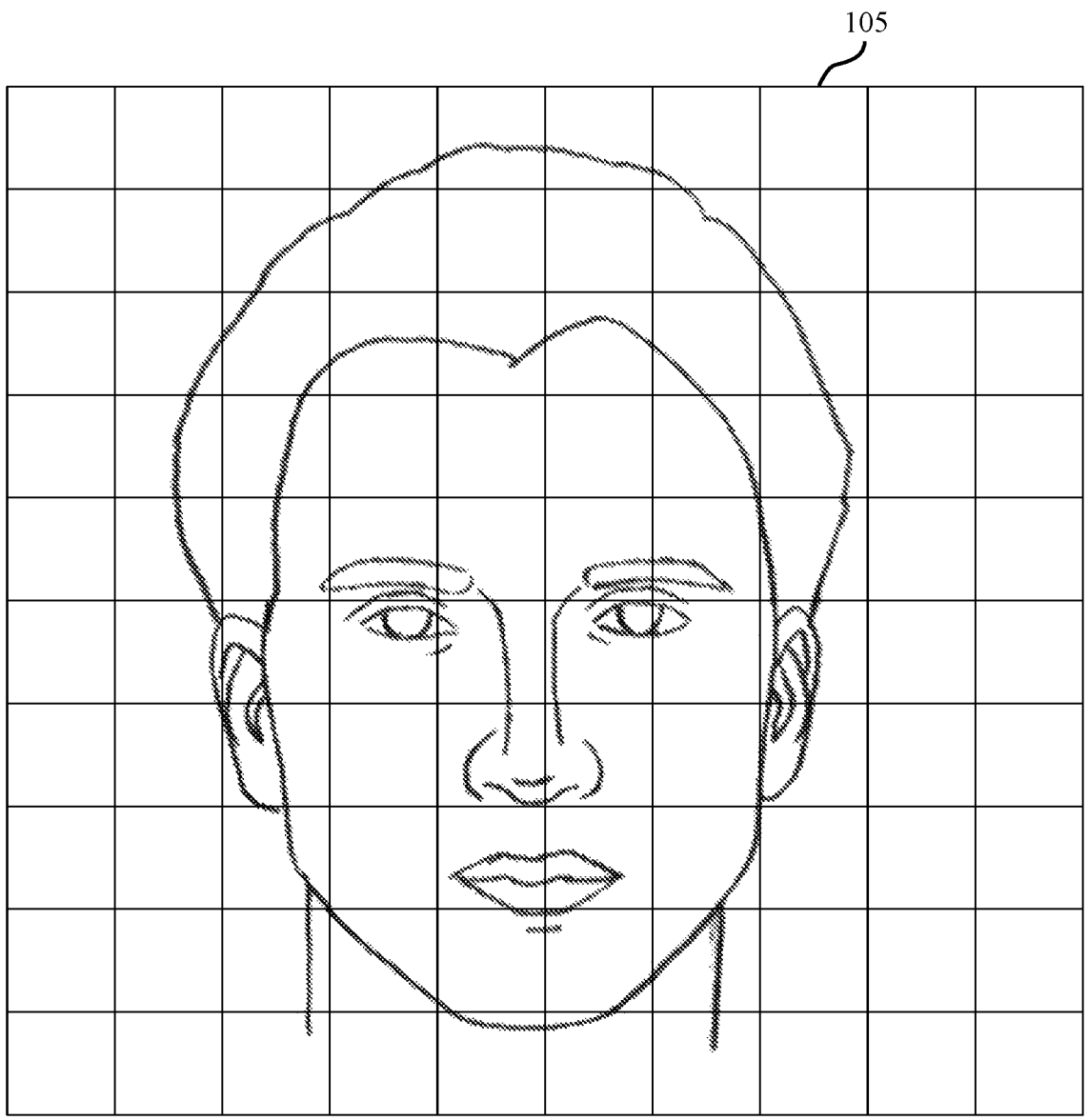
FIG. 1 illustrates an example of a digital image that supports compact models for object recognition in accordance with aspects of the present disclosure.

FIG. 1 illustrates a digital image 100 comprising a plurality of pixels 105. Digital image 100 may be obtained in a variety of ways in accordance with the present disclosure. For example, digital image 100 may be obtained by an image sensor such as a camera which is interoperable with a processor capable of implementing aspects of the present disclosure. Additionally or alternatively, digital image 100 may be obtained by a device (e.g., a wireless device) via a transmission received from another device (e.g., over a wireless link, a wired link, a portable memory, etc.).

The device may process digital image 100 by applying operations to pixels 105 (e.g., to extract facial features which may be used for facial recognition or classification). Such processing may generally include one or more of face detection, face tracking, facial landmark detection, face normalization, feature extraction, and identification/verification.

Facial detection refers to identifying the presence of one or more faces in an image or video frame such as digital image 100. For example, face detection algorithms may use template matching techniques to locate faces within digital image 100. In one example, template matching may contain Haar feature extraction, integral image generation, adaptive boosting (Adaboost) training, and cascaded classifiers. Such template matching may include application of a sliding window to digital image 100. For each window, the Haar features of the current window may be computed from an integral image (e.g., which may be computed prior to beginning template matching). These Haar features may be selected by an Adaboost algorithm and may be used to effectively distinguish windows containing faces from those that do not contain faces (e.g., using a cascaded classifier). By way of example, the cascaded classifier may classify the current window into two categories, one for windows containing faces and one for windows that do not contain faces. If one classifier classifies the window as not containing any faces, the window may be discarded. Otherwise (e.g., if the classifier classifies the window as containing a face), another classifier (which is said to be cascaded with the first classifier) may be used to re-test the window. Any windows classified by each cascaded classifier as containing a face may be labeled as facial candidates. After all such windows have been classified, a non-max suppression algorithm may be used to group the face windows around each face to generate the final result of the detected face.

Face tracking may be used to track faces across frames of a video stream. Because facial detection and recognition may be time consuming, it may not be realistic to detect or recognize faces for every frame. Face tracking techniques may be used for recognized faces to reduce the facial recognition time. That is, if a face has been recognized, a facial recognition algorithm may in some cases skip facial recognition in the following several frames (e.g., if the face can be tracked successfully). As an example, face tracking techniques may detect some key points from a detected face in the previous frame. For example, these detected key points may be significant corners on the face such as facial landmarks (e.g., mouth corners, eyes, nose, ears, etc.). The key points may be matched on the current frame with template matching (e.g., using optical flow or local feature matching). Examples of local features include histogram of gradient, local binary pattern (LBP), etc. Based on the tracking results of the key points between the previous frame and the current frame, the faces in the current frame may be located. Other tracking methods may be based on the face detection results. For example, the intersection over union (IOU) of face bounding boxes may be used to determine a correlation between the face detected in the current frame and the face detected in the previous frame. In some cases, two or more tracking techniques may be combined to yield more robust tracking results. Face tracking may reduce facial recognition time (e.g., significantly), which in turn may save processing bandwidth and power consumption.

Facial landmark detection may provide information for face normalization. A landmark detection algorithm may improve the face recognition accuracy. An example landmark detection algorithm is provided in the context of a cascade of regressors method. For example, a cascade of regressors may be learned from faces with labeled landmarks. The combined outputs of the cascade of regressors may provide accurate estimation of landmark locations. That is, the local distribution of features around each landmark may be learned, and the regressors may give the most probable displacement of the landmark from the estimate of the previous regressor.

Face normalization may refer to processing the face image (e.g., digital image 100) to provide facial alignment (e.g., for better recognition results). By way of example, a face normalization method may take two eye centers (e.g., pupils) as reference points. A face image may be translated, rotated, and scaled to adjust the location and/or size of the two eye centers (e.g., using a similarity transform). Alternatively, some face normalization techniques may use more than two points (e.g., two eye centers, two mouth corners, and a nose tip) as reference points. For example, these landmarks may be based on or identified during the facial landmark detection discussed above. In addition to (e.g., or instead of) size normalization, the illumination of the face images to be compared may be normalized. An example illumination normalization method is described in the context of local image normalization. Using a sliding window, each image patch (e.g., each group of pixels 105) may be normalized (e.g., in terms of mean and standard deviation of illumination values). Specifically, the center pixel 105 illumination value may be subtracted from the mean of the local patch and then divided by the standard deviation of the local patch. Another method for lighting compensation may be based on a discrete cosine transform (DCT). The second coefficient of the DCT may represent the change of the first half of a signal relative to the second half of the signal using a cosine signal. Such information may, for example, be used to compensate for lighting differences caused by side light (e.g., which can cause one half of a face to be brighter than the other half of the face). Removing the second coefficient of the DCT transform and doing an inverse DCT may provide left-right lighting normalization.

Feature extraction generally starts from an initial set of measured data (e.g., pixels 105 of digital image 100) and builds derived values (i.e., features), which may in turn facilitate subsequent learning and/or generalization. Generally, feature extraction may reduce repetitiveness of digital image 100 by transforming the pixels 105 into a reduced set of feature maps. The described techniques may provide for efficient feature extraction in the context of object recognition.

Face identification may refer to the process used to select which identifier with which to associate a face. Similarly, face verification may refer to the process used to verify if a face corresponds to an alleged identity. For face identification, a database containing the features of one or more registered faces may be compared with the extracted features of a given query face image (such as digital image 100). For example, the identifier of a registered face which most closely matches the extracted features may be assigned to the query face image. In some cases, similarity may be measured with distance between features (e.g., cosine distance, Euclidean distance, Manhattan distance, Mahalanobis distance). Another method for face identification may apply classification methods, such as support vector machines, to train classifiers which classify different faces using registered face images and other training images. The query face features may be fed into the classifier, and the output of the classifier may be the identifier of the face. For face verification, the provided face image (e.g., digital image 100) may be compared with one or more registered faces. This comparison may be done via metric distance (e.g., Euclidean distance) comparison or using a classifier trained with one or more registered faces of a given person. Face verification may be related to access control for a device and may therefore be associated with higher accuracy than face identification in some examples. That is, metrics around which to optimize face verification may differ from those around which to optimize face identification. As an example, face verification may attempt to reduce false positives (e.g., to prevent unlicensed access to a device). Alternatively, face identification may attempt to reduce a rejection rate (e.g., the percentage of faces not recognized due to the matching scores or classification results falling below a recognition threshold) without significantly suppressing recognition.

Aspects of the present disclosure relate to a CNN architecture which is compact in network model size, computationally efficient, and provides accurate recognition. For example, the CNN architecture may be used to achieve feature extraction as described above. The described architecture uses depth-wise separable convolution to reduce the size of convolution kernels within the model (and thus reduce the computational load). A MFM operation reduces the number of channels (thus contributing to reductions in computational load without impacting the identification capability). Batch normalization is used in the described model (e.g., to prevent covariate shift). The model may iteratively apply a set of operations as described with reference to FIGS. 3 and 4.

Figure 2:
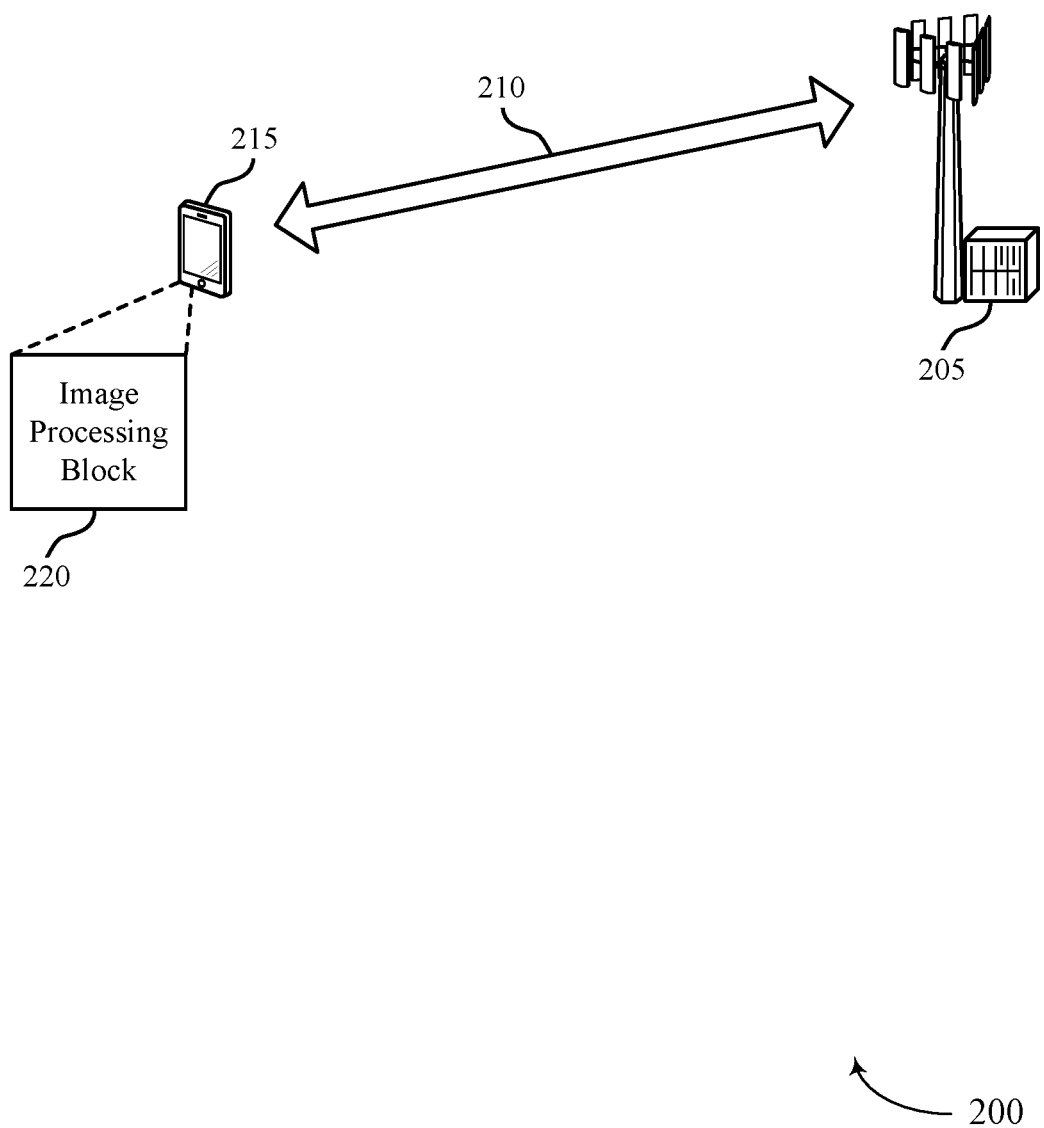
FIG. 2 illustrates an example wireless communications system that supports compact models for object recognition in accordance with aspects of the present disclosure.

FIG. 2 illustrates an example of a wireless communications system 200 that supports compact models for object recognition in accordance with various aspects of the present disclosure. As illustrated, wireless communications system 200 includes a mobile device 215 in communication with a base station 205 (e.g., via wireless link 210). For example, wireless link 210 may be used to communicate data packets representing digital image 100. Although illustrated as occurring between base station 205 and mobile device 215, it is to be understood that wireless link 210 may additionally or alternatively support communication between two mobile devices 215, two base stations 205, a mobile device 215 and an external server, etc.

Base station 205 may wirelessly communicate with mobile devices 215 via one or more base station antennas. Wireless link 210 may include uplink transmissions from mobile device 215 to base station 205, or downlink transmissions, from base station 205 to mobile device 215. Base stations 205 in wireless communications system 200 may interface with a core network through backhaul links. Base stations 205 may also communicate with one another over backhaul links, either directly or indirectly. Base stations 205 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 200 may include base stations 205 of different types (e.g., macro or small cell base stations). The mobile devices 215 described herein may be able to communicate with various types of base stations 205 and network equipment including macro eNBs, small cell eNBs, gNBs, relay base stations, and the like.

Mobile devices 215 may be dispersed throughout wireless communications system 200, and each mobile device 215 may be stationary or mobile. A mobile device 215 may also be referred to as a user equipment (UE), a wireless device, a remote device, a handheld device, or a subscriber device, or some other suitable terminology, where the "device" may also be referred to as a unit, a station, a terminal, or a client. A mobile device 215 may be a personal electronic device such as a cellular phone, a personal digital assistant (PDA), a tablet computer, a laptop computer, or a personal computer. In some examples, a mobile device 215 may also refer to a wireless local loop (WLL) station, an Internet of Things (IoT) device, an Internet of Everything (IoE) device, a machine type communication (MTC) device, or the like, which may be implemented in various articles such as appliances, vehicles, meters, or the like. or some other suitable terminology. Mobile device 215 may include image processing block 220, which may be an example of image processing block 515 described with reference to FIG. 5. Mobile device 215 may thus support a light model with a set (e.g., five) of layers of convolution and one fully connected layer for feature representation, as described further below.

Figure 3:
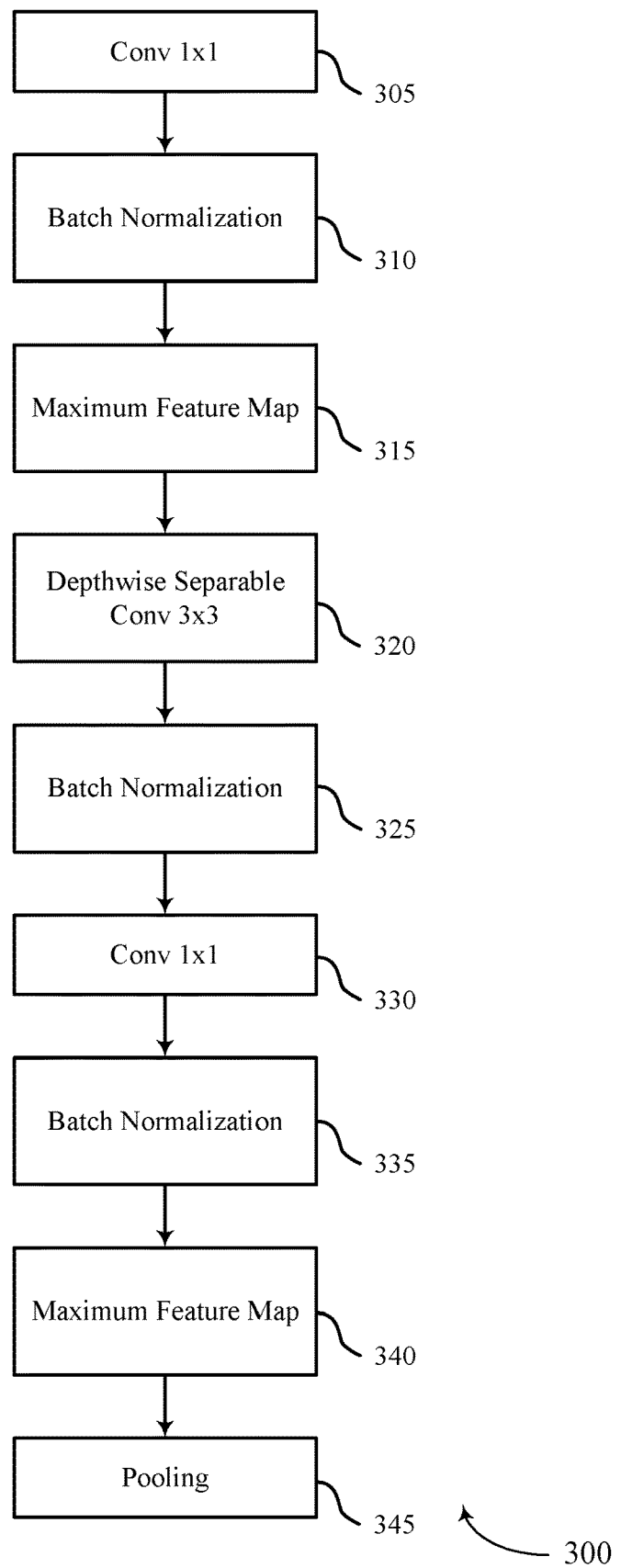
FIGS. 3 and 4 illustrate example process flows that support compact models for object recognition in accordance with aspects of the present disclosure.

FIG. 3 illustrates an example of a process flow 300 that supports compact models for object recognition in accordance with various aspects of the present disclosure. For example, process flow 300 may be implemented (e.g., by a processor of a wireless device such as mobile device 215) as part of a CNN for facial recognition.

In some examples, a device performing process flow 300 may obtain a two-dimensional pixel array (e.g., an image such as digital image 100) for processing. In various examples, the image may be obtained using a sensor such as a camera, may be downloaded via a wireless communication link, may be uploaded from a transportable memory, may be accessed from a database, etc.

At 305, the device may apply a 1×1 convolution layer to a plurality of feature maps (e.g., which may be generated from the two-dimensional pixel array as described with reference to FIG. 4 or may be received from a previous iteration of process flow 300). For example, the 1×1 convolution layer may apply one or more 1×1 kernels to each input channel to generate respective output channels. In aspects of the present disclosure, channels and feature maps may be used interchangeably to refer to a reduced set of pixels from an image.

At 310, a batch normalization layer may be applied to the output(s) of the 1×1 convolution layer (e.g., to remove or reduce covariate shift). For example, the batch normalization layer may normalize a mean of the values within or across feature maps, a variance of the values within or across feature maps, etc.

At 315, a MFM operation may be used to strategically merge channels. For example, each MFM layer may extract a greater value from a pair of values from designated channels to form a new channel from the original two channels. Though described in the context of operating on a pair of input channels to generate a single output channel, it is to be understood that the MFM layer may extract a greatest value from any suitable number of input channels (e.g., three, four, etc.) to generate a single output channel without deviating from the scope of the present disclosure. In the example of a pair of input channels, the number of output channels from the MFM operation at 315 may be half the number of input channels that are received at 315. In some cases, the MFM operation may replace (e.g., or supplement) an activation layer, such as a rectified linear unit (ReLU) activation function.

At 320, a 3×3 depth-wise separable convolution layer may be applied to the output channels from the MFM operation at 315. For example, the depth-wise separable convolution may traverse each of the output channels from 315 (e.g., which may be referred to as input channels at 320) with a single (e.g., or respective) 3×3 kernel to generate a set of feature maps corresponding to the input channels at 320. For example, in the case that sixteen input channels are received at 320, sixteen feature maps may be generated using the 3×3 kernel. Each of these feature maps may then be traversed by a given number (e.g., corresponding to the desired number of channels to be output from 320) of 1×1 (or other sized) convolutions to generate a second set of feature maps. For example, and returning to the example introduced above, if thirty-two channels are to be output from 320, each of the sixteen feature maps generated using the 3×3 kernel may be traversed by 32 1×1 convolutions to generate the second set of feature maps. Subsequently, one feature map of the second set of feature maps that corresponds for each of the original input channels at 320 may be selected and combined to generate the desired number (e.g., thirty-two) of output channels. That is, each combination operation may be performed across sixteen feature maps, one for each of the original input channels. Thus, the depth-wise separable convolution may be said to include a first operation applied to each input channel to generate a set of feature maps followed by a second combining operation applied across the set of feature maps to generate the output channels The depth-wise separable convolution layer may reduce the number of parameters to be computed compared to a regular convolution while still achieving the same results. That is, because the number of input channels for the depth-wise separable convolution kernels may be one, depth-wise separable convolution may reduce the weights of convolution (e.g., significantly).

At 325, batch normalization may be performed on the channels output from 320 (e.g., to remove covariate shift). A 1×1 convolution layer at 330 (e.g., which may use the same kernels as the 1×1 convolution layer at 305 or may use different kernels) with batch normalization at 335 follows. For example, aspects of process flow 300 may mimic the functionality of a 3×3 convolution with fewer weights involved, which can further reduce the computation of convolutions. Another MFM layer at 340 further reduces the number of output channels (e.g., as described with reference to the MFM layer at 315). In some cases, the MFM layer at 340 may combine a different number of feature maps than the MFM layer at 315 (e.g., three instead of two, two instead of four, etc.). At 345, a pooling layer may be used (e.g., to reduce the size or complexity of the remaining channels).

Figure 4:
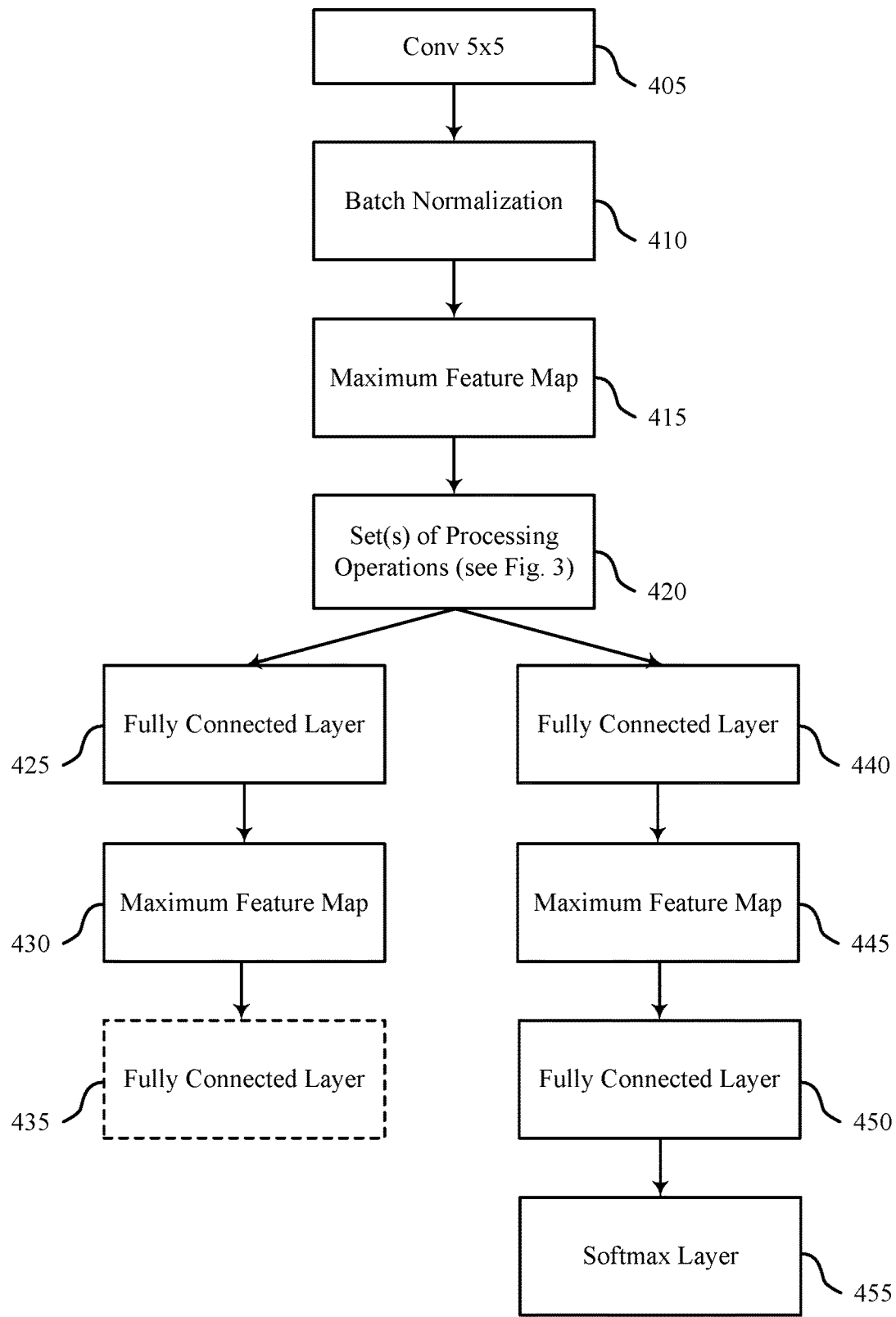

FIG. 4 illustrates an example of a process flow 400 that supports compact models for object recognition in accordance with various aspects of the present disclosure. For example, process flow 400 may be implemented (e.g., by a processor of a wireless device) as part of a CNN for facial recognition.

In some examples, a device performing process flow 400 may obtain a two-dimensional pixel array (e.g., an image such as digital image 100) for processing. In various examples, the image may be obtained using a sensor such as a camera, may be downloaded via a wireless communication link, may be uploaded from a transportable memory, may be accessed from a database, etc. Aspects of the following are illustrated using example numbers of channels which propagate through process flow 400; it is to be understood that these numbers are provided for the sake of explanation and are not limiting of scope.

At 405, a 5×5 convolution layer may be applied to the two-dimensional pixel array to generate a set of feature maps. For example, the 5×5 convolution layer may generate ninety-six feature maps (e.g., or input channels) based on application of various kernels to the pixel array. At 410, batch normalization may be performed (e.g., to remove or reduce covariate shift). At 415, an MFM operation may be performed (e.g., which may reduce the number of channels to forty-eight in the case that channel pairs are used by the MFM operation).

At 420, one or more sets of processing operations may be performed. For example, each set of processing operations may represent an iteration of the operations described with reference to process flow 300. By way of example, a first iteration of the set of processing operations may be applied to the forty-eight channels (e.g., to generate ninety-six channels). These ninety-six channels may then be fed to a second iteration of the set of operations described with reference to process flow 300 to generate 192 channels. These 192 channels may be fed to a third iteration of the set of operations described with reference to process flow 300 to generate 128 channels. These 128 channels may be fed to a fourth iteration of the set of operations described with reference to process flow 300 to generate 128 channels. More (or fewer) than four iterations of the set of processing operations described with reference to process flow 300 may be performed.

At 425, a fully connected layer may receive the 128 channels and generate 512 output channels. These 512 output channels may be fed to a MFM operation at 430 (e.g., which may output 256 channels). These 256 output channels may be or represent the extracted features to represent the face. At 435, a second fully connected layer may optionally act as a classification layer (e.g., for training purposes).

In some cases, process flow 400 may be extended to provide a multi-task learning method (e.g., to detect closed eyes along with facial feature extraction). That is, process flow 400 may in some cases contain two subnets (one for facial feature extraction and one for ocular detection). By way of example for the multi-task learning method, two fully connected layers (e.g., at 425 and at 440) may be connected to the last pooling layer of the backbone network of facial feature extraction (e.g., which may refer to the operations described with reference to 405 through 420). The subnet for ocular detection may be trained without update of the backbone network (e.g., may be performed after and independently from the backbone network). That is, in some examples, only the parameters of the two fully connected layers (at 440 and at 450) may be learned to train the ocular detection. The weights of the backbone network may in some cases be determined during training for facial recognition (e.g., but may be fixed for ocular detection training).

At 440, the fully connected layer may receive the 128 channels and generate 128 output channels (e.g., to be used for ocular detection). Thus, the ocular detection subnet may utilize the information contained in the spatial locations of the feature maps generated by the backbone network to extract information related to ocular detection. At 445, a MFM operation may generate 64 output channels from the 128 channels generated at 440. At 450, a second fully connected layer may receive the 64 channels from 445 and generate two output channels. At 455, a softmax layer may be attached for ocular detection (e.g., to classify the eyes as open or closed).

Figure 5:
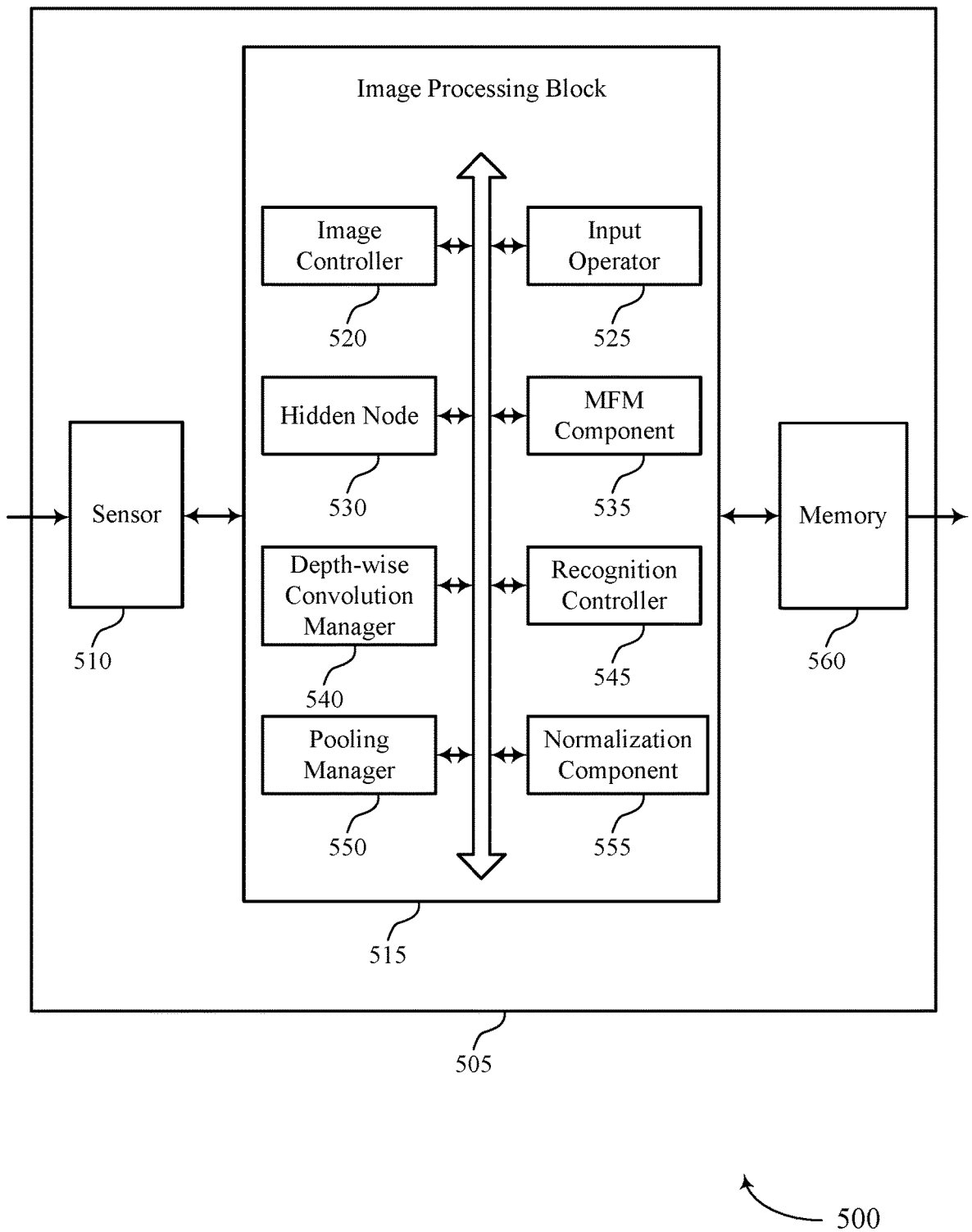
FIGS. 5 and 6 show block diagrams of devices that support compact models for object recognition in accordance with aspects of the present disclosure.

FIG. 5 shows a block diagram 500 of a device 505 that supports compact models for object recognition in accordance with aspects of the present disclosure. Device 505 may be an example of aspects of a mobile device 215 or device 605 as described with reference to FIGS. 2 and 6. Device 505 may include sensor 510, image processing block 515, and memory 560. Each of these components may be in communication with one another (e.g., via one or more buses). Image processing block 515 may be an example of aspects of the processor 615 described with reference to FIG. 6. Image processing block 515 may include image controller 520, input operator 525, hidden node(s) 530, MFM component 535, depth-wise convolution manager 540, recognition controller 545, pooling manager 550, and normalization component 555.

Sensor 510 may include or be an example of a digital imaging sensor for taking photos and video. In some examples, sensor 510 may receive information such as packets, user data, or control information associated with various information channels (e.g., from a transceiver 635 described with reference to FIG. 6). Information may be passed on to other components of the device. Additionally or alternatively, components of device 505 used to communicate data over a wireless (e.g., or wired) link may be in communication with image processing block 515 (e.g., via one or more buses) without passing information through sensor 510.

Image processing block 515 may be an example of aspects of the processor 615 described with reference to FIG. 6. Image processing block 515 and/or at least some of its various sub-components may be implemented in hardware, software executed by a processor, firmware, or any combination thereof. If implemented in software executed by a processor, the functions of the image processing block 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

Image processing block 515 and/or at least some of its various sub-components may be physically located at various positions, including being distributed such that portions of functions are implemented at different physical locations by one or more physical devices. In some examples, image processing block 515 and/or at least some of its various sub-components may be a separate and distinct component in accordance with various aspects of the present disclosure. In other examples, image processing block 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Image controller 520 may obtain a two-dimensional array of pixels representing an image. For example, image controller 520 may receive the two-dimensional array of pixels from sensor 510, from a transceiver, etc. By way of example, the two-dimensional array of pixels may be a digital image, a frame of a video, or some other digital representation of an image.

Input operator 525 may apply a first convolutional operation to the two-dimensional array of pixels to generate a set of input channels. In some cases, applying the first convolutional operation to the two-dimensional array of pixels includes applying a set of convolution kernels to the two-dimensional array of pixels to generate a set of initial input channels, each convolution kernel having a same size (e.g., five pixels by five pixels).

Hidden node 530 may perform a set of processing operations on the set of input channels. The set of processing operations may include applying a second convolutional operation to the set of input channels to generate a second set of input channels. In some cases, hidden node 530 may feed the set of output channels of a last iteration of the set of processing operations to a fully connected layer to generate a set of connected-layer output channels. In some cases, hidden node 530 may feed the set of output channels of the last iteration of the set of processing operations to a second fully connected layer to generate a second set of connected-layer output channels. In some cases, performing the set of processing operations further includes applying the second convolutional operation to the set of output channels to generate a third set of input channels. In some cases, the set of processing operations is performed a set of times, where the set of input channels of a second iteration of the set of processing operations is based on the set of output channels of a first iteration of the set of processing operations. Thus, in some cases, the operations of a device may include a plurality of hidden nodes 530. In some cases, the operations of hidden node 530 may be performed by a processor but may not be associated with distinct hardware components (i.e., may represent internal operations of a CNN).

MFM component 535 may generally combine features from two or more input channels (e.g., to reduce a number of channels to be processed). For example, MFM component 535 may divide the second set of input channels into channel groups, where each input channel of the second set of input channels is associated with a single channel group. MFM component 535 may perform a feature selection operation for each channel group to generate a set of intermediate channels, where each intermediate channel is associated with a respective channel group.

MFM component 535 may divide the third set of input channels into second channel groups, where each input channel of the third set of input channels is associated with a single second channel group. MFM component 535 may perform the feature selection operation for each second channel group to generate a second set of intermediate channels, where each intermediate channel of the second set of intermediate channels is associated with a respective channel group of the second channel groups.

MFM component 535 may divide the set of connected-layer output channels into third channel groups, where each connected-layer output channel of the set of connected-layer output channels is associated with a single channel group of the third channel groups. MFM component 535 may perform the feature selection operation for each third channel group to generate a set of final channels, where each final channel is associated with a respective channel group of the third channel groups and where the object in the image is recognized based on the set of final channels.

MFM component 535 may divide the set of normalized input channels into initial channel groups, where each normalized input channel of the set of normalized input channels is associated with a single channel group of the initial channel groups. MFM component 535 may perform the feature selection operation for each initial channel group to generate the set of input channels, where each input channel is associated with a respective initial channel group. In some cases, dividing the second set of input channels into channel groups includes dividing the second set of input channels into pairs such that a number of the set of intermediate channels is half a number of the second set of input channels.

MFM component 535 may divide the second set of connected-layer output channels into fourth channel groups, where each connected-layer output channel of the second set of connected-layer output channels is associated with a single channel group of the fourth channel groups. MFM component 535 may perform the feature selection operation for each fourth channel group to generate a second set of final channels, wherein each final channel of the second set of final channels is associated with a respective channel group of the fourth channel groups.

Depth-wise convolution manager 540 may apply a third convolutional operation to the set of intermediate channels, where the third convolutional operation includes a first operation applied to each intermediate channel to generate a set of feature maps followed by a second operation applied across the set of feature maps to generate a set of output channels.

Recognition controller 545 may recognize an object in the image based on the set of output channels. For example, recognition controller 545 may compare the set of output channels to one or more features received from memory of a device. Additionally or alternatively, recognition controller 545 may represent aspects of a classifier which recognizes the object in the image based on classifying the output (e.g., using a fully connected layer). In some cases, recognition controller 545 may train one or more components of image processing block 515 (e.g., by feeding information back to the components to improve performance of the components according to a gradient descent process). Recognition controller 545 may detect a feature of the object in the image based at least in part on the second plurality of final channels. For example, recognition controller 545 may perform ocular detection on a face recognized in the image based at least in part on the second plurality of final channels.

Pooling manager 550 may apply a pooling function to the second set of intermediate channels to generate a second set of output channels, where the object in the image is recognized based on the second set of output channels.

Normalization component 555 may apply a batch normalization operation to the set of initial input channels to generate a set of normalized input channels, where the batch normalization operation adjusts a mean of one or more initial input channels, a variance of one or more initial input channels, or both. In some cases, performing the set of processing operations further includes applying one or more batch normalization operations, each batch normalization operation adjusting a mean of one or more channels, a variance of one or more channels, or both.

Memory 560 may store information (e.g., facial feature information) generated by other components of the device such as image processing block 515. For example, memory 560 may store facial feature information with which to compare an output of image processing block 515. Memory 560 may comprise one or more computer-readable storage media. Examples of memory 560 include, but are not limited to, random access memory (RAM), static RAM (SRAM), dynamic RAM (DRAM), read-only memory (ROM), electrically erasable programmable read-only memory (EEPROM), compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor (e.g., image processing block 515).

Figure 6:
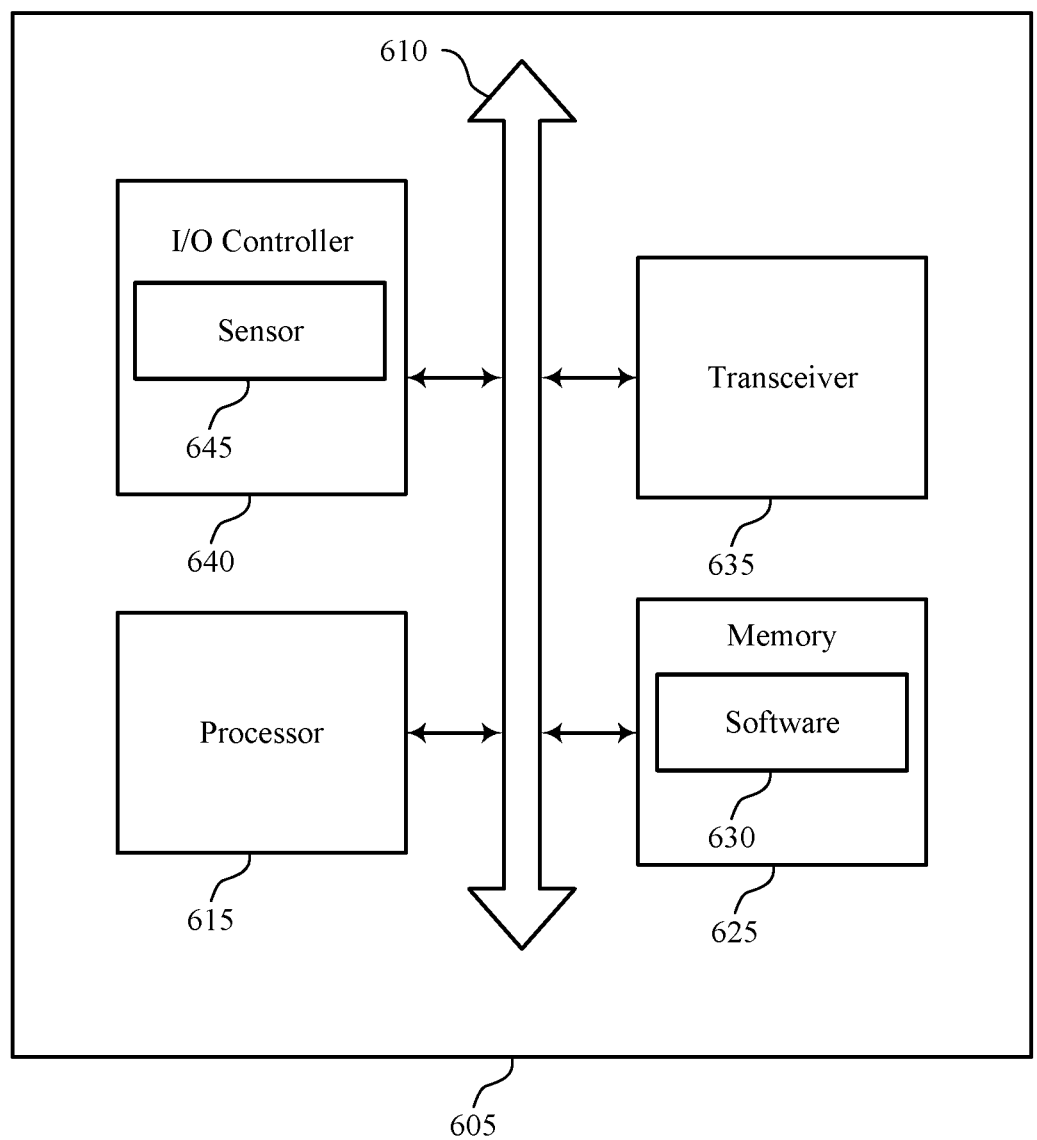

FIG. 6 shows a block diagram 600 including a device 605 that supports compact models for object recognition in accordance with aspects of the present disclosure. Device 605 may be an example of or include the components of a mobile device 215 or device 505 as described above, e.g., with reference to FIGS. 2 and 5. Device 605 may include components for bi-directional voice and data communications including components for transmitting and receiving communications, including processor 615, memory 625, software 630, transceiver 635, I/O controller 640, and sensor 645. These components may be in electronic communication via one or more buses (e.g., bus 610).

Processor 615 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, a graphics processing unit (GPU), or any combination thereof). In some cases, processor 615 may be configured to operate a memory array using a memory controller. In other cases, a memory controller may be integrated into processor 615. Processor 615 may be configured to execute computer-readable instructions stored in a memory to perform various functions (e.g., functions or tasks supporting compact models for object recognition). Processor 615 may be an example of image processing block 515 described above with reference to FIG. 5.

Memory 625 may include RAM and ROM. The memory 625 may store computer-readable, computer-executable software 630 including instructions that, when executed, cause the processor to perform various functions described herein. In some cases, the memory 625 may contain, among other things, a basic input/output system (BIOS) which may control basic hardware or software operation such as the interaction with peripheral components or devices.

Software 630 may include code to implement aspects of the present disclosure, including code to support compact models for object recognition. Software 630 may be stored in a non-transitory computer-readable medium such as system memory or other memory. In some cases, the software 630 may not be directly executable by the processor but may cause a computer (e.g., when compiled and executed) to perform functions described herein.

Transceiver 635 may communicate bi-directionally, via one or more antennas, wired, or wireless links as described above. For example, the transceiver 635 may represent a wireless transceiver and may communicate bi-directionally with another wireless transceiver. The transceiver 635 may also include a modem to modulate the packets and provide the modulated packets to the antennas for transmission, and to demodulate packets received from the antennas.

I/O controller 640 may manage input and output signals for device 605. I/O controller 640 may also manage peripherals not integrated into device 605. In some cases, I/O controller 640 may represent a physical connection or port to an external peripheral. In some cases, I/O controller 640 may utilize an operating system such as iOS®, ANDROID®, MS-DOS®, MS-WINDOWS®, OS/2®, UNIX®, LINUX®, or another known operating system. In other cases, I/O controller 640 may represent or interact with a modem, a keyboard, a mouse, a touchscreen, or a similar device. In some cases, I/O controller 640 may be implemented as part of a processor. In some cases, a user may interact with device 605 via I/O controller 640 or via hardware components controlled by I/O controller 640. In some cases, I/O controller 640 may be or include sensor 645 (e.g., a digital imaging sensor for taking photos and video).

Figure 7:
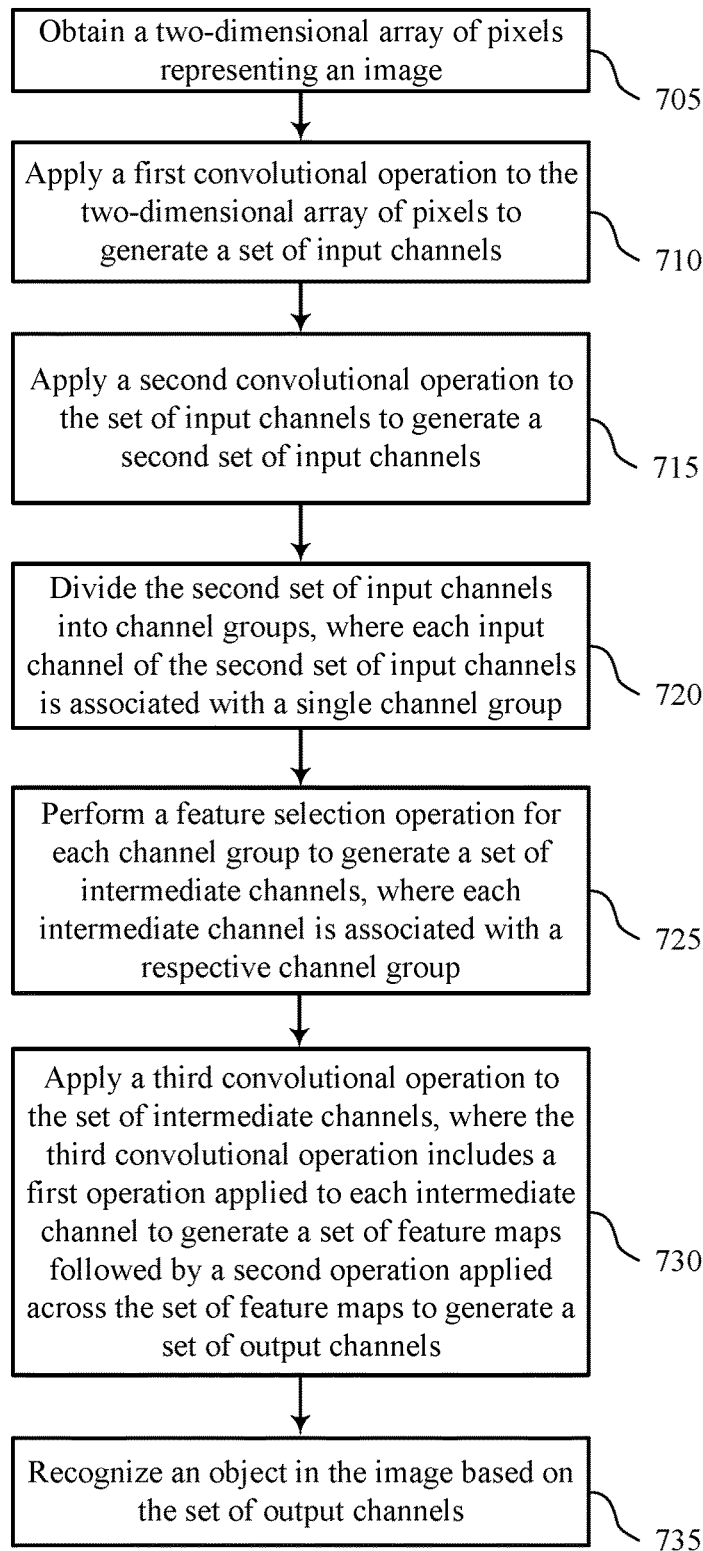
FIG. 7 illustrates a method for compact models for object recognition in accordance with aspects of the present disclosure.

FIG. 7 shows a flowchart illustrating a method 700 for compact models for object recognition in accordance with aspects of the present disclosure. The operations of method 700 may be implemented by a device or its components as described herein. For example, the operations of method 700 may be performed by a processor, such as image processing block 515 as described with reference to FIG. 5. In some examples, a device may execute a set of codes to control the functional elements of the device to perform the functions described below. Additionally or alternatively, the device may perform aspects of the functions described below using special-purpose hardware.

At 705 the device may obtain a two-dimensional array of pixels representing an image. The operations of 705 may be performed according to the methods described herein. In certain examples, aspects of the operations of 705 may be performed by an image controller as described with reference to FIG. 5.

At 710 the device may apply a first convolutional operation to the two-dimensional array of pixels to generate a plurality of input channels. The operations of 710 may be performed according to the methods described herein. In certain examples, aspects of the operations of 710 may be performed by a input operator as described with reference to FIG. 5.

In some cases, the device may perform a set of processing operations on the plurality of input channels, the set of processing operations comprising the operations described with reference to 715, 720, 725, and 730. In some cases, the device may perform the set of processing operations a plurality of times (e.g., as described with reference to FIG. 4).

At 715 the device may apply a second convolutional operation to the plurality of input channels to generate a second plurality of input channels. The operations of 715 may be performed according to the methods described herein. In certain examples, aspects of the operations of 715 may be performed by a hidden node as described with reference to FIG. 5.

At 720 the device may divide the second plurality of input channels into channel groups, wherein each input channel of the second plurality of input channels is associated with a single channel group. The operations of 720 may be performed according to the methods described herein. In certain examples, aspects of the operations of 720 may be performed by a MFM component as described with reference to FIG. 5.

At 725 the device may perform a feature selection operation for each channel group to generate a plurality of intermediate channels, wherein each intermediate channel is associated with a respective channel group. The operations of 725 may be performed according to the methods described herein. In certain examples, aspects of the operations of 725 may be performed by a MFM component as described with reference to FIG. 5.

At 730 the device may apply a third convolutional operation to the plurality of intermediate channels, wherein the third convolutional operation comprises a first operation applied to each intermediate channel to generate a plurality of feature maps followed by a second operation applied across the plurality of feature maps to generate a plurality of output channels. The operations of 730 may be performed according to the methods described herein. In certain examples, aspects of the operations of 730 may be performed by a depth-wise convolution manager as described with reference to FIG. 5.

At 735 the device may recognize an object in the image based at least in part on the plurality of output channels. The operations of 735 may be performed according to the methods described herein. In certain examples, aspects of the operations of 735 may be performed by a recognition controller as described with reference to FIG. 5.

It should be noted that the methods described above describe possible implementations, and that the operations and the steps may be rearranged or otherwise modified and that other implementations are possible. Further, aspects from two or more of the methods may be combined. In some cases, one or more operations described above may be omitted or adjusted without deviating from the scope of the present disclosure. Thus the methods described above are included for the sake of illustration and explanation and are not limiting of scope.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for object recognition, comprising:
   a processor;
   memory in electronic communication with the processor; and
   instructions stored in the memory and executable by the processor to cause the apparatus to:
   obtain a two-dimensional array of pixels representing an image;
   apply a first convolutional operation to the two-dimensional array of pixels to generate a plurality of input channels;
   perform a set of processing operations on the plurality of input channels, the set of processing operations comprising:
     applying a second convolutional operation to the plurality of input channels to generate a second plurality of input channels;
     dividing the second plurality of input channels into first channel groups, wherein each input channel of the second plurality of input channels is associated with a single first channel group;
     performing a feature selection operation for each first channel group to generate a first plurality of intermediate channels, wherein each intermediate channel is associated with a respective channel group of the first channel groups; and
     applying a third convolutional operation to the first plurality of intermediate channels, wherein the third convolutional operation comprises a first operation applied to each intermediate channel to generate a plurality of feature maps followed by a second operation applied across the plurality of feature maps to generate a first plurality of output channels;
     applying the second convolutional operation to the plurality of output channels to generate a third plurality of input channels;
     dividing the third plurality of input channels into second channel groups, wherein each input channel of the third plurality of input channels is associated with a single second channel group;
     performing the feature selection operation for each second channel group to generate a second plurality of intermediate channels, wherein each intermediate channel of the second plurality of intermediate channels is associated with a respective channel group of the second channel groups; and
     applying a pooling function to the second plurality of intermediate channels to generate a second plurality of output channels; and
   recognize an object in the image based at least in part on the first plurality of output channels and the second plurality of output channels.

2. The apparatus of claim 1, wherein the set of processing operations further comprise:
   applying one or more batch normalization operations, each batch normalization operation adjusting a mean of one or more channels, a variance of one or more channels, or both.

3. The apparatus of claim 1, wherein the set of processing operations is performed a plurality of times, and wherein the plurality of input channels of a second iteration of the set of processing operations is based at least in part on the first plurality of output channels of a first iteration of the set of processing operations.

4. The apparatus of claim 3, wherein the instructions are further executable by the processor to cause the apparatus to:
   feed the first plurality of output channels of a last iteration of the set of processing operations to a fully connected layer to generate a plurality of connected-layer output channels;
   divide the plurality of connected-layer output channels into third channel groups, wherein each connected-layer output channel of the plurality of connected-layer output channels is associated with a single channel group of the third channel groups; and
   perform the feature selection operation for each third channel group to generate a plurality of final channels, wherein each final channel is associated with a respective channel group of the third channel groups and wherein the object in the image is recognized based at least in part on the plurality of final channels.

5. The apparatus of claim 4, wherein the instructions are further executable by the processor to cause the apparatus to:
   feed the first plurality of output channels of the last iteration of the set of processing operations to a second fully connected layer to generate a second plurality of connected-layer output channels;
   divide the second plurality of connected-layer output channels into fourth channel groups, wherein each connected-layer output channel of the second plurality of connected-layer output channels is associated with a single channel group of the fourth channel groups;
   perform the feature selection operation for each fourth channel group to generate a second plurality of final channels, wherein each final channel of the second plurality of final channels is associated with a respective channel group of the fourth channel groups; and
   detect a feature of the object in the image based at least in part on the second plurality of final channels.

6. The apparatus of claim 1, wherein the instructions to divide the second plurality of input channels into first channel groups are executable by the processor to cause the apparatus to:
  divide the second plurality of input channels into pairs such that a number of the first plurality of intermediate channels is half a number of the second plurality of input channels.

7. The apparatus of claim 1, wherein the instructions to apply the first convolutional operation to the two-dimensional array of pixels are executable by the processor to cause the apparatus to:
  apply a plurality of convolution kernels to the two-dimensional array of pixels to generate a plurality of initial input channels, each convolution kernel having a same size;
  apply a batch normalization operation to the plurality of initial input channels to generate a plurality of normalized input channels, wherein the batch normalization operation adjusts a mean of one or more initial input channels, a variance of one or more initial input channels, or both;
  divide the plurality of normalized input channels into initial channel groups, wherein each normalized input channel of the plurality of normalized input channels is associated with a single channel group of the initial channel groups; and
  perform the feature selection operation for each initial channel group to generate the plurality of input channels, wherein each input channel is associated with a respective initial channel group.

8. A method for object recognition at a device, comprising:
  obtaining a two-dimensional array of pixels representing an image;
  applying a first convolutional operation to the two-dimensional array of pixels to generate a plurality of input channels;
  performing a set of processing operations on the plurality of input channels, the set of processing operations comprising:
    applying a second convolutional operation to the plurality of input channels to generate a second plurality of input channels;
    dividing the second plurality of input channels into first channel groups, wherein each input channel of the second plurality of input channels is associated with a single first channel group;
    performing a feature selection operation for each first channel group to generate a first plurality of intermediate channels, wherein each intermediate channel is associated with a respective channel group of the first channel groups; and
    applying a third convolutional operation to the first plurality of intermediate channels, wherein the third convolutional operation comprises a first operation applied to each intermediate channel to generate a plurality of feature maps followed by a second operation applied across the plurality of feature maps to generate a first plurality of output channels;
    applying the second convolutional operation to the plurality of output channels to generate a third plurality of input channels;
    dividing the third plurality of input channels into second channel groups, wherein each input channel of the third plurality of input channels is associated with a single second channel group;
    performing the feature selection operation for each second channel group to generate a second plurality of intermediate channels, wherein each intermediate channel of the second plurality of intermediate channels is associated with a respective channel group of the second channel groups; and
    applying a pooling function to the second plurality of intermediate channels to generate a second plurality of output channels; and
  recognizing an object in the image based at least in part on the first plurality of output channels and the second plurality of output channels.

9. The method of claim 8, wherein performing the set of processing operations further comprises:
  applying one or more batch normalization operations, each batch normalization operation adjusting a mean of one or more channels, a variance of one or more channels, or both.

10. The method of claim 8, wherein the set of processing operations is performed a plurality of times, and wherein the plurality of input channels of a second iteration of the set of processing operations is based at least in part on the first plurality of output channels of a first iteration of the set of processing operations.

11. The method of claim 10, further comprising:
  feeding the first plurality of output channels of a last iteration of the set of processing operations to a fully connected layer to generate a plurality of connected-layer output channels;
  dividing the plurality of connected-layer output channels into third channel groups, wherein each connected-layer output channel of the plurality of connected-layer output channels is associated with a single channel group of the third channel groups; and
  performing the feature selection operation for each third channel group to generate a plurality of final channels, wherein each final channel is associated with a respective channel group of the third channel groups and wherein the object in the image is recognized based at least in part on the plurality of final channels.

12. The method of claim 8, wherein dividing the second plurality of input channels into first channel groups comprises:
  dividing the second plurality of input channels into pairs such that a number of the first plurality of intermediate channels is half a number of the second plurality of input channels.

13. The method of claim 8, wherein applying the first convolutional operation to the two-dimensional array of pixels comprises:
  applying a plurality of convolution kernels to the two-dimensional array of pixels to generate a plurality of initial input channels, each convolution kernel having a same size;
  applying a batch normalization operation to the plurality of initial input channels to generate a plurality of normalized input channels, wherein the batch normalization operation adjusts a mean of one or more initial input channels, a variance of one or more initial input channels, or both;
  dividing the plurality of normalized input channels into initial channel groups, wherein each normalized input channel of the plurality of normalized input channels is associated with a single channel group of the initial channel groups; and
  performing the feature selection operation for each initial channel group to generate the plurality of input channels, wherein each input channel is associated with a respective initial channel group.

14. A non-transitory computer-readable medium storing code for object recognition, the code comprising instructions executable by a processor to:
   obtain a two-dimensional array of pixels representing an image;
   apply a first convolutional operation to the two-dimensional array of pixels to generate a plurality of input channels;
   perform a set of processing operations on the plurality of input channels, the set of processing operations comprising instructions executable by the processor to:
      apply a second convolutional operation to the plurality of input channels to generate a second plurality of input channels;
      divide the second plurality of input channels into first channel groups, wherein each input channel of the second plurality of input channels is associated with a single first channel group;
      perform a feature selection operation for each first channel group to generate a first plurality of intermediate channels, wherein each intermediate channel is associated with a respective channel group of the first channel groups; and
      apply a third convolutional operation to the first plurality of intermediate channels, wherein the third convolutional operation comprises a first operation applied to each intermediate channel to generate a plurality of feature maps followed by a second operation applied across the plurality of feature maps to generate a first plurality of output channels;
      apply the second convolutional operation to the plurality of output channels to generate a third plurality of input channels;
      divide the third plurality of input channels into second channel groups, wherein each input channel of the third plurality of input channels is associated with a single second channel group;
      perform the feature selection operation for each second channel group to generate a second plurality of intermediate channels, wherein each intermediate channel of the second plurality of intermediate channels is associated with a respective channel group of the second channel groups; and
      apply a pooling function to the second plurality of intermediate channels to generate a second plurality of output channels; and
   recognize an object in the image based at least in part on the first plurality of output channels and the second plurality of output channels.

15. The non-transitory computer-readable medium of claim 14, wherein the set of processing operations is performed a plurality of times, and wherein the plurality of input channels of a second iteration of the set of processing operations is based at least in part on the first plurality of output channels of a first iteration of the set of processing operations.

16. The non-transitory computer-readable medium of claim 14, wherein the instructions to divide the second plurality of input channels into first channel groups are executable by the processor to:
   divide the second plurality of input channels into pairs such that a number of the first plurality of intermediate channels is half a number of the second plurality of input channels.

17. The non-transitory computer-readable medium of claim 14, wherein the instructions to apply the first convolutional operation to the two-dimensional array of pixels are executable by the processor to:
   apply a plurality of convolution kernels to the two-dimensional array of pixels to generate a plurality of initial input channels, each convolution kernel having a same size;
   apply a batch normalization operation to the plurality of initial input channels to generate a plurality of normalized input channels, wherein the batch normalization operation adjusts a mean of one or more initial input channels, a variance of one or more initial input channels, or both;
   divide the plurality of normalized input channels into initial channel groups, wherein each normalized input channel of the plurality of normalized input channels is associated with a single channel group of the initial channel groups; and
   perform the feature selection operation for each initial channel group to generate the plurality of input channels, wherein each input channel is associated with a respective initial channel group.

* * * * *